US008340958B2

(12) United States Patent
Gruhn et al.

(10) Patent No.: US 8,340,958 B2
(45) Date of Patent: Dec. 25, 2012

(54) TEXT AND SPEECH RECOGNITION SYSTEM USING NAVIGATION INFORMATION

(75) Inventors: Rainer Gruhn, Ulm (DE); Andreas Marcel Riechert, Reutlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 328 days.

(21) Appl. No.: 12/693,392

(22) Filed: Jan. 25, 2010

(65) Prior Publication Data

US 2010/0191520 A1 Jul. 29, 2010

(30) Foreign Application Priority Data

Jan. 23, 2009 (EP) .................................. 09000983

(51) Int. Cl.
*G06F 17/27* (2006.01)
*G10L 21/00* (2006.01)

(52) U.S. Cl. ................ 704/9; 704/1; 704/257; 704/270; 704/272; 704/275

(58) Field of Classification Search .................. 704/1–9, 704/257, 270, 272, 275
See application file for complete search history.

(56) References Cited

U.S. PATENT DOCUMENTS

| | | | | |
|---|---|---|---|---|
| 5,752,232 A * | 5/1998 | Basore et al. | .............. | 704/275 |
| 6,108,631 A * | 8/2000 | Ruhl | .............. | 704/270 |
| 6,334,102 B1 * | 12/2001 | Lewis et al. | .............. | 704/255 |
| 6,646,573 B1 * | 11/2003 | Kushler et al. | .............. | 341/28 |
| 6,850,886 B2 * | 2/2005 | Abrego et al. | .............. | 704/240 |
| 7,016,849 B2 * | 3/2006 | Arnold et al. | .............. | 704/275 |
| 7,328,155 B2 * | 2/2008 | Endo et al. | .............. | 704/251 |
| 7,430,473 B2 * | 9/2008 | Foo et al. | .............. | 701/455 |
| 7,634,409 B2 * | 12/2009 | Kennewick et al. | .......... | 704/257 |
| 7,650,348 B2 * | 1/2010 | Lowles et al. | .......... | 707/999.101 |
| 7,680,661 B2 * | 3/2010 | Co et al. | .............. | 704/251 |
| 7,904,298 B2 * | 3/2011 | Rao | .............. | 704/270 |
| 7,953,598 B2 * | 5/2011 | Brown | .............. | 704/240 |
| 8,005,488 B2 * | 8/2011 | Staffaroni et al. | .......... | 455/456.2 |
| 8,086,444 B2 * | 12/2011 | Jarmulak et al. | .............. | 704/10 |
| 2002/0045463 A1 * | 4/2002 | Chen et al. | .............. | 455/566 |
| 2002/0087309 A1 * | 7/2002 | Lee et al. | .............. | 704/240 |
| 2002/0111810 A1 * | 8/2002 | Khan et al. | .............. | 704/275 |
| 2003/0182131 A1 * | 9/2003 | Arnold et al. | .............. | 704/275 |
| 2004/0139404 A1 | 7/2004 | Kawashima et al. | | |
| 2004/0260543 A1 * | 12/2004 | Horowitz et al. | .............. | 704/221 |
| 2006/0074660 A1 * | 4/2006 | Waters et al. | .............. | 704/251 |
| 2006/0190258 A1 * | 8/2006 | Verhasselt et al. | .......... | 704/255 |

(Continued)

FOREIGN PATENT DOCUMENTS

EP 1233407 A1 8/2002

(Continued)

*Primary Examiner* — Pierre-Louis Desir
*Assistant Examiner* — Fariba Sirjani
(74) *Attorney, Agent, or Firm* — Brinks Hofer Gilson & Lione

(57) ABSTRACT

A system and method are provided for recognizing a user's speech input. The method includes the steps for detecting the user's speech input, recognizing the user's speech input by comparing the speech input to a list of entries using language model statistics to determine the most likely entry matching the user's speech input, and detecting navigation information of a trip to a predetermined destination, where the most likely entry is determined by modifying the language model statistics taking into account the navigation information. A system and method is further provided that takes into account navigation trip information to determine the most likely entry using language model statistics for recognizing text input.

13 Claims, 4 Drawing Sheets

U.S. PATENT DOCUMENTS

| | | | |
|---|---|---|---|
| 2007/0162281 A1* | 7/2007 | Saitoh et al. | 704/251 |
| 2007/0192311 A1* | 8/2007 | Pun et al. | 707/5 |
| 2007/0208555 A1* | 9/2007 | Blass et al. | 704/9 |
| 2008/0126314 A1 | 5/2008 | Thorn | |
| 2008/0133228 A1* | 6/2008 | Rao | 704/231 |
| 2008/0154612 A1 | 6/2008 | Evermann et al. | |
| 2008/0177541 A1* | 7/2008 | Satomura | 704/251 |
| 2008/0221879 A1* | 9/2008 | Cerra et al. | 704/235 |
| 2008/0221898 A1* | 9/2008 | Cerra et al. | 704/270.1 |
| 2008/0235017 A1* | 9/2008 | Satomura | 704/246 |
| 2008/0270118 A1* | 10/2008 | Kuo et al. | 704/9 |
| 2008/0288252 A1* | 11/2008 | Cerra et al. | 704/244 |
| 2009/0030698 A1* | 1/2009 | Cerra et al. | 704/275 |
| 2009/0171659 A1* | 7/2009 | Pearce et al. | 704/235 |
| 2009/0171669 A1* | 7/2009 | Engelsma et al. | 704/275 |
| 2009/0187399 A1* | 7/2009 | O'Dell | 704/8 |
| 2009/0228281 A1* | 9/2009 | Singleton et al. | 704/275 |
| 2009/0248415 A1* | 10/2009 | Jablokov et al. | 704/251 |
| 2009/0287680 A1* | 11/2009 | Paek et al. | 707/5 |
| 2009/0287681 A1* | 11/2009 | Paek et al. | 707/5 |
| 2009/0313017 A1* | 12/2009 | Nakazawa et al. | 704/244 |
| 2009/0326927 A1* | 12/2009 | Morin et al. | 704/10 |
| 2010/0131447 A1* | 5/2010 | Creutz et al. | 706/52 |
| 2010/0185448 A1* | 7/2010 | Meisel | 704/256.1 |
| 2011/0054894 A1* | 3/2011 | Phillips et al. | 704/235 |
| 2011/0066634 A1* | 3/2011 | Phillips et al. | 707/769 |
| 2011/0093265 A1* | 4/2011 | Stent et al. | 704/243 |
| 2011/0106527 A1* | 5/2011 | Chiu | 704/9 |

FOREIGN PATENT DOCUMENTS

| | | |
|---|---|---|
| WO | WO 2005/066934 A1 | 7/2005 |
| WO | WO 2007/112543 A1 | 10/2007 |

* cited by examiner

TEXT AND SPEECH RECOGNITION SYSTEM USING NAVIGATION INFORMATION

RELATED APPLICATIONS

This application claims priority of European Patent Application Serial Number 09 000 983.8, filed on Jan. 23, 2009, titled IMPROVED TEXT AND SPEECH INPUT USING NAVIGATION INFORMATION, which application is incorporated in its entirety by reference in this application.

BACKGROUND OF THE INVENTION

1. Field of the Invention

This invention relates to a method for recognizing a user's speech input, as well as a method for supporting text input utilizing navigation information. The invention also relates to the systems support such methods. The invention finds especially, but not exclusively, application in vehicles; however, it can also be used in connection with portable navigation units.

2. Related Art

To input a SMS via a keyboard, a user can type the full words via a numerical keyboard. However, this procedure is very time-consuming. To speed up the process, automatic completion systems have been built that suggest completions of words given the first part of the word, i.e. given the first letters. These systems are based on dictionaries with word frequency statistics. Those statistics may be updated if the user types the same word frequently, but they do not take into account environment information that is available to a navigation unit.

Furthermore, speech-driven electronic systems are known that can be controlled by a user uttering speech commands. Speech commands are recognized by a speech recognition unit that converts the spoken words to a string of characters. The recognition is based on language model statistics including a database of known words and including the likelihood of an occurrence of the different words in the database taking into account the grammar of the language in which the speech command was uttered.

If, while a navigation unit is guiding a user to a predetermined destination, the user of the speech recognition unit or a user of a text input unit utters a speech command or enters a text into a system while being on his/her way to the predetermined destination, the likelihood that the uttered speech command or the input text contains information about the trip to a predetermined destination is quite high. Accordingly, a need exists to improve a speech recognition unit or to improve an automatic completion during a text input when the user is on the way to a predetermined destination.

SUMMARY

A method for recognizing a user speech input is provided including the steps of detecting the user's speech input. Furthermore, the user's speech input is recognized by comparing the speech input to a list of entries using language model statistics in order to determine the most likely entry best matching the user's speech input. In an additional step navigation information of a navigation unit is detected, where the most likely entry as recognized is determined by modifying the language model statistics taking into account the navigation information. When the speech recognition unit is used in connection with a navigation unit, the likelihood that navigation-related information of an already determined trip to a predetermined destination is present in the speech input increases. Accordingly, this information is provided to the speech recognition unit recognizing the speech input allowing the system to take into account environment information that is available from the navigation unit. An example of a user speech input while being on the way to a predetermined destination may be a user dictating a message to a speech recognition unit that can be transmitted to a recipient via a telecommunications network. By taking into account the navigation information the speech recognition accuracy can be improved.

A method for supporting a text input in an input unit is also provided in which a first part of the text input is detected. The text input is recognized by comparing the first part of the text input to a list of entries based on language model statistics to suggest a most likely candidate of a completed first input. Additionally, navigation information relating to a trip to a predetermined destination is detected and the most likely candidate of the completed text input is determined by modifying the language model statistics taking into account the navigation information. The most likely candidate or the most likely candidates of a completed text input are suggested to a user of the input unit.

By way of example, the navigation information may contain information such as the starting location of the trip, the destination location of the trip, via points of the trip, the current position, the overall travel time of the trip or the travel time until now and the expected arrival time. In case the user of the speech recognition system or of the text input system sends an e-mail to another person either using speech commands or using a keyboard-based text input, the probability that the message contains the pieces of information mentioned above is quite high. By increasing the likelihood of a list entry contained in the list of entries and also contained in a navigation information, the speech recognition rate or success probability of the proposal for the most likely candidate in the case of an automatic completion of words is increased.

A speech recognition system is also provided for recognizing the user's speech input, the system includes a speech detector for detecting the user speech input and a speech recognition unit recognizing the user speech input by comparing the speech input to a list of entries using language model statistics to determine the most likely entry which best matches the user's speech input. Furthermore, a navigation unit is provided in which navigation information is present that can be utilized by the recognition unit for determining the most likely entry by modifying the language model statistics taking into account said navigation information. Such a speech recognition system has an improved speech recognition rate as the user's environment information can be better considered than in speech recognition systems which recognize the speech input based on language model statistics that only take into account some general text database generated by considering the likelihood of a word isolated (unigram) or considering the context and input history (n-gram).

A system is also provided for supporting a text input or for automatically suggesting completions for words given by the first letters including a text recognition unit for recognizing the text input by comparing a first part of the text input to the list of entries using said language model statistics that is used to suggest the most likely candidate of the completed text input. The navigation unit of the system provides navigation information and the text recognition unit determines the most likely candidate by modifying the language model statistics taking into account the navigation information. The text recognition unit furthermore suggests the most likely candidate or most likely candidates of completed text inputs to the user of the system.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
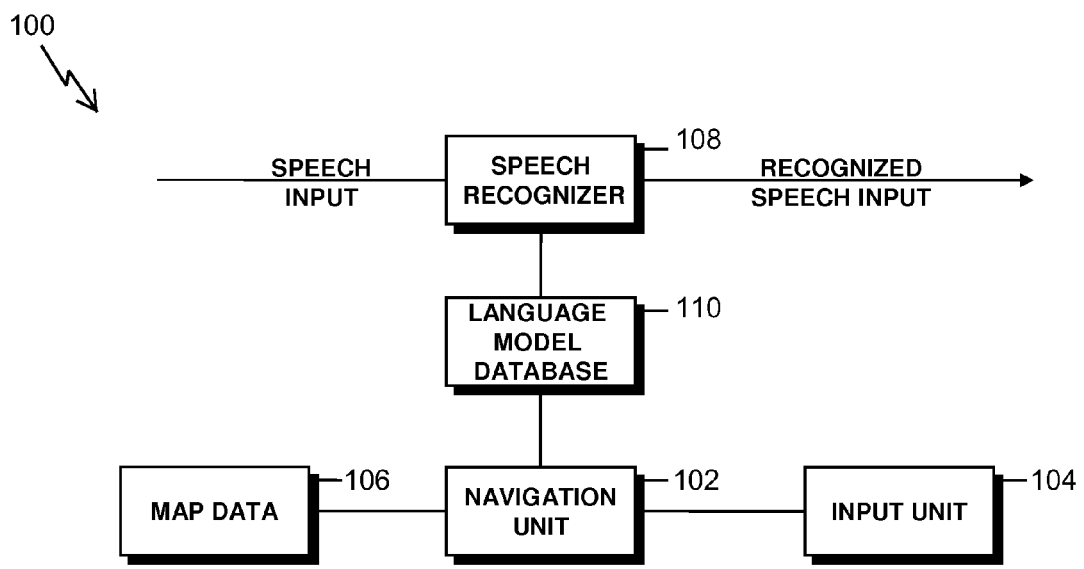
FIG. 1 illustrates a schematic view of one example of a speech recognition system that takes into account navigation information.

In FIG. 1, one example of a speech recognition system 100 is shown that utilizes current navigation information to increase speech recognition performance. The system 100 may be, for example, incorporated into a vehicle. It is, however, also possible that the system 100 be utilized in connection with a mobile stand-alone unit that may be used by a pedestrian, a bicycle user or in a vehicle. The speech recognition system 100 includes a navigation unit 102 providing guiding instructions to the user to a predetermined destination. The selected user destination can be input via an input unit 104 or may be otherwise provided to the navigation unit 102. The navigation unit 102 may be a conventional navigation unit 102 that includes a position detecting unit (not shown) and a database with map data 106 on the basis of which a route can be calculated from the present position of the navigation unit 102 to a desired destination location. The navigation unit 102 calculates, based on different criterions, such as shortest or fastest route, a route to said destination location. The user can furthermore specify destination information via points that are located the route to the destination location. Such points may be points of interest, such as interesting sightseeing monuments, a hotel, a gas station, etc.

On the way to the destination, the user of the speech recognition system 100 may desire to dictate a message, such as a SMS or an e-mail to be sent via wireless communication networks, to a recipient or may want to write a memo for future use. In such a situation, the probability that the information sent in this message contains information of the trip to the destination is quite high. By way of example, the user of a system may want to inform the recipient of the letter of his/her arrival time or may inform the recipient that he/she is on his/her way to an arranged meeting point etc.

The user of the speech recognition system 100 may dictate the letter using speech input into a speech recognition unit 108. The speech recognition unit 108 detects the speech input and converts the speech signal to a sequence of words by first recognizing a phoneme string and by comparing the phoneme string to a list of entries using a language model. The language model contains statistical, grammatical and/or syntax rules of a language and recognizes the speech input. For interpreting the speech input language, model statistics are used, such as the likelihood that a word occurs in isolated form (unigram) in a context and input history (n-gram). The language model together with the language model statistics may be stored in a language model database 110. The speech recognizer 108 is then able to use the language model database 110 for correctly interpreting the speech input. In the language model statistics, each word has a predetermined likelihood of occurrence, be it alone, be it as a word pair in the form of a bigram or be it in view of the context in the case of an n-gram. In the present example, the starting location, the current position, the destination location, via points, the starting time, the current travel time, the expected arrival time are known by the navigation unit 102. Such navigation information can be provided to the language model database 110 to change the language model statistics in the language model database 110 that are utilized to recognize the speech input. The entries in the list of entries, i.e. the database of known words, can be emphasized by increasing the probability of occurrence of the entries also contained in the navigation information. By way of example, in case the user is traveling to Hamburg and it is known from the navigation unit 120 that the user will drive to a certain address, such as "Jungfernsteg" and will arrive there at approximately 3:15 pm, the navigation information such as "Hamburg", "Jungfernsteg", "3:15" can be fed to the language model database, the likelihood of these list entries being increased. When the user of the speech recognition unit 108 utters one of the words contained in the navigation information, the probability that the speech recognition unit 108 correctly interprets the speech input is remarkably increased. In the present invention, the language model statistics is not only calculated on the basis of some general text before the assembly of the products as it is known in the art, but the language model statistics is updated taking into account any given environmental information, such as the navigation information.

Figure 2:
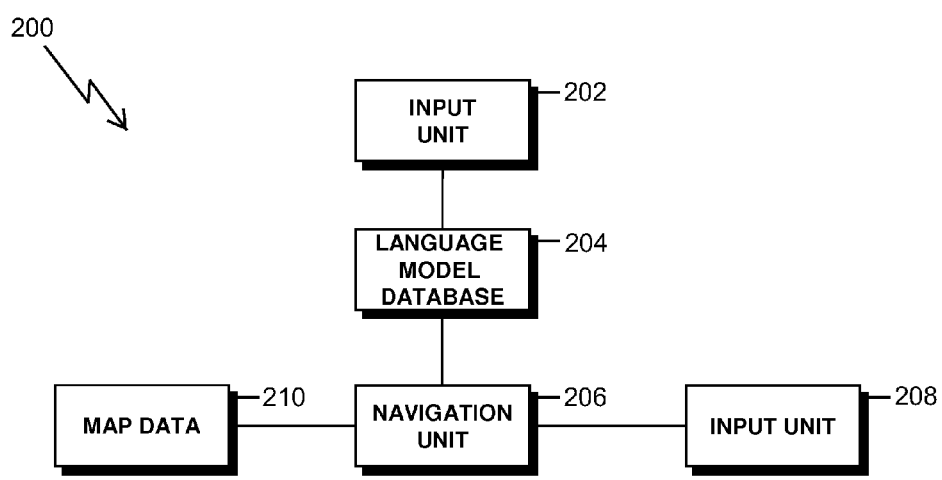
FIG. 2 illustrates one example of an input system that automatically suggests completed text input by taking into account navigation information.

In FIG. 2, another example of an implementation of the system 200 is shown in which the navigation information provided by a navigation unit 206 can increase the functionality of the man-machine-interface. In FIG. 2, an input unit 202 is provided for the entry of text via, for example, a keyboard. The input unit 202 may also be a unit capable of recognizing a hand-written character input. The input unit 202 may contain hard keys, such as a keyboard, or may contain a display showing soft keys that can be selected by touching the display. The system 200 may help increase the speed of entry of text into the input unit 202. To speed up the input process, an automatic completion is utilized as soon as the first part of the input text is input. By way of example, after the first two or three letters are input by user, the input unit 202 may suggest completed words. For suggesting a completed text input, based on the first part of the text input, the input unit 202 makes reference to the language model database 204, which may correspond to the language model database 110 described in connection with FIG. 1. In the language model database 204, the different expressions known to the system are stored as list of entries, the database language model database 204 furthermore storing the likelihood of occurrence of the different words. The text input into the input unit 202 may be a message, memo, note or letter, as discussed in connection with FIG. 1. However, in connection with FIG. 2, the text is manually input and not dictated. In both situations, navigation information provided by navigation unit 206 can help to improve and to speed up the text input. The navigation unit 206 may have a separate input unit 202. However, the input unit 202 may also be the same as input unit 208. As discussed in connection with FIG. 1, the map data contained in the map database 210 may assist in calculating the optimum route to a predetermined destination. The navigation information given by the navigation unit 206 is fed to the language model database 204, where the weight of list entries also contained in the navigation information may be increased. The system 200 may further increase the speed of text as the system 200 can suggest faster and more reliable the correct completed text input. In the above-referenced example, in case the user wants to input the location "Hamburg" and may have already input the first two letters "Ha", the input unit may propose "Hamburg" as the most likely candidate of a completed text instead of other expressions beginning with the same two letters.

The input unit 202 may be an input unit of a cellular phone where the text input is not unambiguous as, by pressing an actuating element, different characters may be selected. For supporting the text input using systems such as T9, the system 200 may be improved by providing the navigation information to the language model database 204 where the most likely candidate of the input text is suggested based on the actuated actuating element and based on the received navigation information.

In another example of an implementation, the system 200 may assist in a method in which the text input is a phonetic representation of the text as it is common in many Asian languages. In case of a homophone, one of the different possible meanings of the phonetic representation has to be selected. This selection or suggestion of the most likely candidate of the different possible meanings, i.e. of the completed text input may similar be improved by using the navigation information.

In yet another example of an implementation, the text is input using a handwritten form, a handwriting recognition unit being provided as part of the input unit to recognize the handwritten text input. To recognize the different characters input in handwritten form, the provided navigation information may also be helpful. By way of example, it is difficult to unambiguously differentiate between the number "1", the large character "I" and the small character "l". Accordingly, the recognition rate of the handwritten input can also be improved by taking into account the navigation information provided by the navigation unit.

In both implementations illustrated in FIG. 1 and FIG. 2, it may happen that information provided in the navigation unit 102 and 206, such as an address or a destination location, such as a small village, is not contained in the list of entries. In this situation, this information may be provided to the language model database 110 and 204 as a new list entry, and this new list entry may be weighted more heavily than other list entries of the same type.

Figure 3:
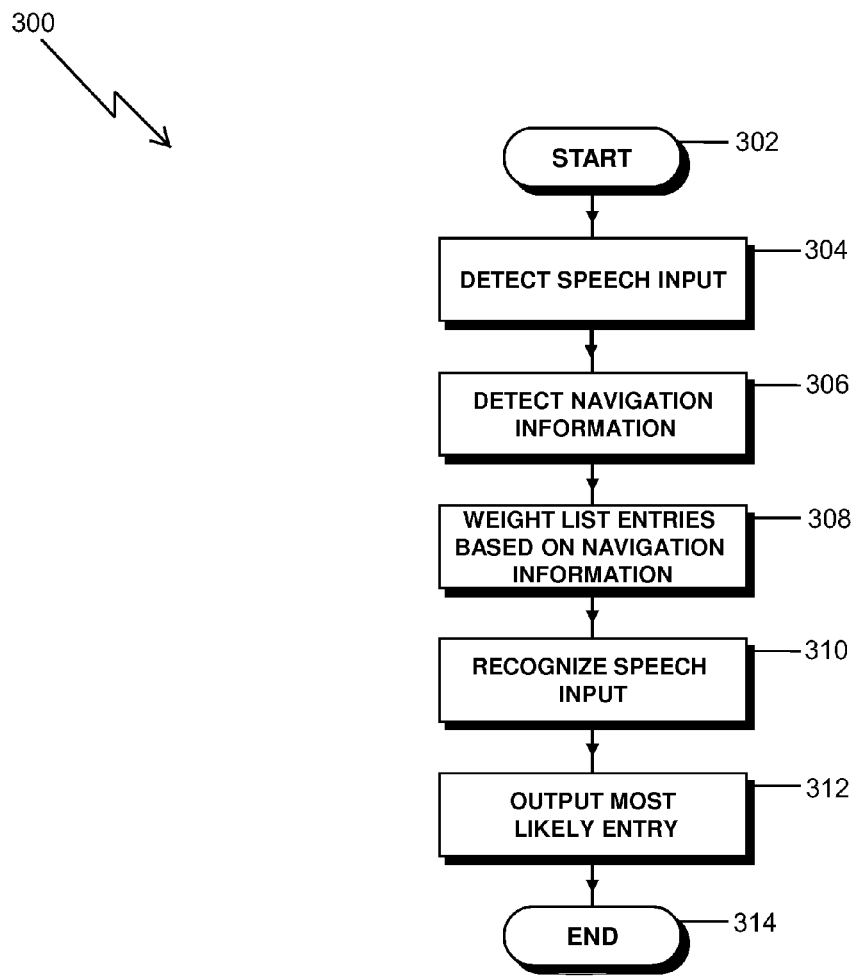
FIG. 3 illustrates a flowchart showing example steps for recognizing speech input by taking into account navigation information.

In FIG. 3, a flow diagram 300 is illustrated that provides example steps to increase the speech recognition rate in a system, such as the speech recognition system 100, in FIG. 1, utilizing current information, such as information provided by a trip to a predetermined destination. The process starts in step 302. In step 304, speech input is detected. In an additional step 306, which may occur before the detection of the speech input, navigation information can be detected. By way of example, every time the navigation unit 102 is utilized, the current navigation information may be fed to the speech recognition unit 108, so that the latter is always updated with the current navigation information. In step 308, the list entries contained in the language model database 110 and contained in the navigation information, such as the name of the destination location or the name of via points or any figures, such as the arrival time, can be weighted more heavily—meaning that the weight is increased compared to a normal likelihood of a word given for a predetermined language. In step 310, the speech recognition is carried out, the speech recognition step may utilize statistical models, such as a hidden Markov models (HMMs) to recognize the speech input. The speech input, as it was recognized by the speech recognition unit, can be output to the user, as shown in step 312. Usually, the most likely word or sequence of words is output. The recognized speech output presented to the user can be confirmed or corrected by the user. Furthermore, it is possible that in the case of a single word, the most likely entries of the recognized word may be presented to the user on a display allowing the user to select the desired expression. The method ends in step 314.

Figure 4:
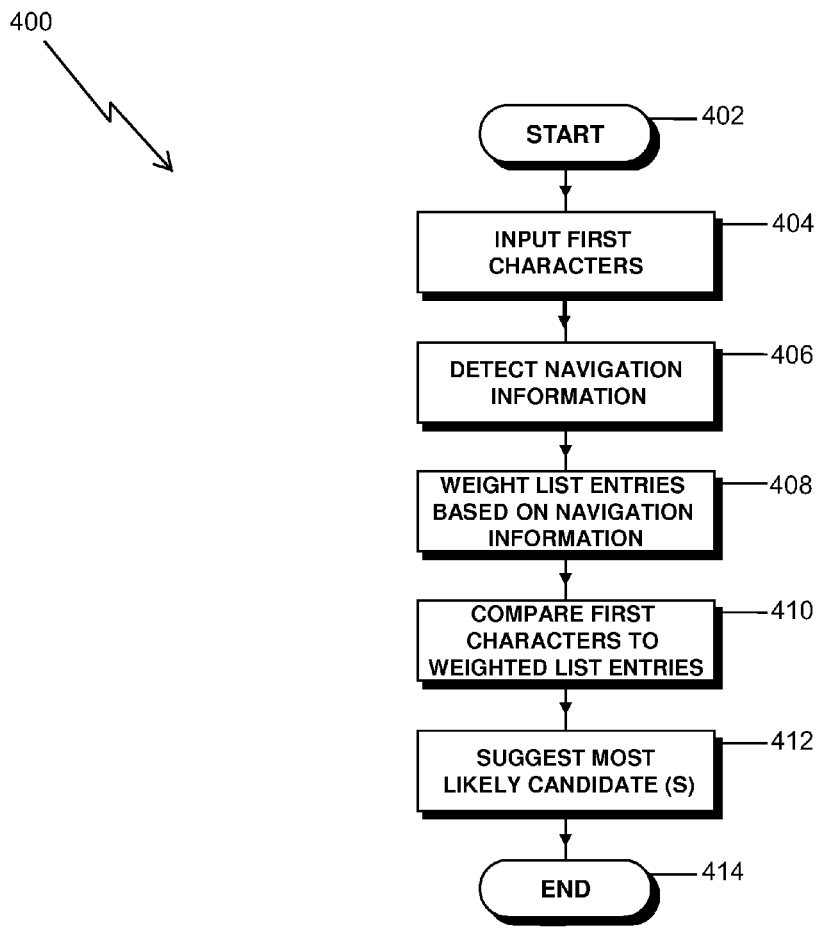
FIG. 4 illustrates a flowchart showing example primary steps for automatically suggesting a completed text input by taking into account navigation information.

In FIG. 4, a flow diagram is provided that illustrate example primary steps for text input using the system 200 of FIG. 2. The process starts at step 402. In step 402, the first characters are input into the input unit 202. Depending on the sequence of characters, it may be enough to input two or three characters that form a basis for the input unit 202 to suggest a completed input. The navigation information is detected in step 406. It should be understood that the navigation information could also have been input before the user starts to input the text into the input unit 202. In step 408, the list entries that are also contained in the navigation information are weighted by increasing their weight compared to the weight before the navigation information was input. In step 410, the first characters input in step 404 are compared to the weighted list of entries and in step 408 and the most likely candidate or the most likely candidates are displayed to the user, at step 412, who can either confirm the proposed most likely candidate or select one of the most likely candidates or discard the suggestions. The method ends in step 414.

Summarizing, the proposed systems and methods help to increase the comfort and speech recognition accuracy and are especially useful in connection with languages where words are input with some phonetical transcription, such as Asian languages, and then converted into characters by selection of a user. This conversion process requires statistical models which can profit from the proposed consideration of information from the navigation unit.

In addition to the navigation unit additional information may be provided by the infotainment unit connected to the systems 100 and 200 shown in FIGS. 1 and 2. This infotainment unit can provide the current infotainment status, such as the piece of music currently played or the film that is currently streamed or the TV station that is currently received. The given environmental information helps to increase the recognition rate in the case of a speech recognition or in the case a completed text input should be suggested.

The invention may also be applied in case of a text input that is not unambiguous. By way of example, when the text is input using an input module in which each key represents more than one character, e.g. in case of a cellular phone, the navigation information can also help to recognize the first part of the text input or the complete text input using the navigation information. By way of example, in a cellular phone in case the user presses the buttons "2" and "3" of the cellular phone, this could be the character sequence "AD", "AF" or "BE". For dete fining which text input is meant, the navigation information of a combined system having a cellular phone and a navigation module can help to render the ambiguous text input unambiguous.

The invention may also be applied in the following context. In some languages such as Japanese, Chinese or Korean, the user may input the text in a phonetic representation of the text. In case of homophones, different expressions having the input phonetic representation are displayed to the user for further selection, or the most likely expression may be automatically selected. In this example, not only the first part but the complete phonetic representation of the text input is detected and the most likely candidate of the text input, i.e. one expression among different expressions having the same phonetic representation can be selected taking into account the navigation information.

In another implementation, it is furthermore possible to additionally consider information of other sources, e.g. in a vehicle application the current infotainment status meaning that it is determined which CD or DVD is currently played or which radio or TV station is currently received. The list entries relating to said current infotainment status can be determined and the likelihood of said entertainment related list entries can also be increased.

The invention can furthermore be applied in connection with hand-writing recognition, where the text is input in hand-written form into an input unit, the input unit recognizing the hand-writing. In this context it can also be helpful to use the available navigation information such as destination location, arrival time, etc. This information can help to increase the recognition rate of the hand-writing recognition, when the user writes down the message to be transmitted or a memo for future use.

The proposed systems and methods have special relevance for Asian languages, where input methods with statistical support are much more common than in Latin character-based languages. In those languages words are often input with some phonetic transcription such as Kana or Pinyin and then converted to Chinese characters. In general, the invention is especially helpful when used in connection with languages having lots of homophones, i.e. expressions having the same or similar articulation, but are written differently.

It will be understood, and is appreciated by persons skilled in the art, that one or more processes, sub-processes, or process steps described in connection with FIGS. 1-4 may be performed by hardware and/or software. If the process is performed by software, the software may reside in software memory (not shown) in a suitable electronic processing component or system such as, one or more of the functional components or modules schematically depicted in FIGS. 1-4. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for recognizing a user's speech input comprising the following steps:
utilizing a navigation unit for:
detecting navigation information of a trip to a predetermined destination, and
modifying language model statistics in a language model database containing a list of entries for list entries that are in the language model database and that are contained in the navigation information;
detecting whether words in the navigation information are contained in the list of entries,
where any words in the navigation information that are not contained in the list of entries are added to the list of entries as new entries, and where the likelihood of the new entries is set higher than an average likelihood of the entries in the list of entries;
detecting the user's speech input; and
recognizing the user's speech input by comparing the user's speech input to the list of entries using the modified language model statistics to determine the most likely entry best matching the user's speech input,
where the navigation information contains at least one of the following information: an overall travel time of the trip, the current travel time of the trip, and an expected arrival time.

2. The method of claim 1, where the language model statistics indicate a likelihood of the different entries in the list of entries, where the likelihood of a list entry contained in the navigation information is increased in the step of modifying language model statistics.

3. The method of claim 1, where the navigation information further contains at least one of the following information: a starting location of the trip, a destination location of the trip, via points of the trip, and the current position.

4. The method of claim 1, further comprising the steps of:
detecting a current infotainment status;
determining list entries relating to said current infotainment status; and
increasing the likelihood of said infotainment-related list entries.

5. A method for supporting a text input in an input unit, the method comprising the steps of:
utilizing a navigation unit for:
detecting navigation information of a trip to a predetermined destination, and
modifying language model statistics in a language model database containing a list of entries for list entries that are in the language model database and that are contained in the navigation information;

detecting whether words in the navigation information are contained in the list of entries; where any words in the navigation information that are not contained in the list of entries are added to the list of entries as new entries, and where the likelihood of the new entries is set higher than an average likelihood of the entries in the list of entries;

receiving text input at the input unit of an application that is not the navigation unit;

detecting at least a first part of the text input;

recognizing the text input by comparing said at least first part of the text input to a list of entries in the language model database based on the modified language model statistics in order to suggest a most likely candidate of a completed text input; and suggesting said most likely candidate of the completed text input to a user of the input unit, where the navigation information contains at least one of the following information: an overall travel time of the trip, the current travel time of the trip, and an expected arrival time.

6. The method of claim 5, where the language model statistics indicate a likelihood of the different entries in the list of entries, where the likelihood of a list entry contained in the navigation information is increased in the step of modifying language model statistics.

7. The method of claim 5, where the navigation information further contains at least one of the following information: a starting location of the trip, a destination location of the trip, via points of the trip, and the current position.

8. The method of claim 5, further comprising the steps of: detecting a current infotainment status;
determining list entries relating to said current infotainment status; and
increasing the likelihood of said infotainment-related list entries.

9. The method of claim 5, further comprising the step of recognizing said first part of the text input using the navigation information based on the modified language model statistics when the first part of the text input is not unambiguous.

10. The method of claim 5, where the text input is input into the input unit in a hand-written form, where the text input is recognized taking into account the navigation information based on the modified language model statistics.

11. The method of claim 5, where the text is input in a phonetic representation and the complete text input is detected, where the phonetic representation is converted to different expressions having substantially the same phonetic representation, the most likely expression being selected taking into account the navigation information based on the modified language model statistics.

12. A speech recognition system recognizing a user's speech input, comprising:
A navigation unit configured to generate navigation information of a trip to a predetermined destination;
a speech detector configured to detect the user's speech input;
a language model database comprising a list of entries and language model statistics for the list of entries; and
a speech recognition unit configured to receive words in the navigation information from the navigation unit, and to adjust the language model statistics for entries in the list of entries that are contained in the navigation information, the speech recognition unit being configured to recognize the user's speech input by comparing the speech input to the list of entries in the language model database using the modified language model statistics in order to determine the most likely entry best matching the user's speech input,
where the speech recognition unit detects whether words in the navigation information are contained in the list of entries,
where any words in the navigation information that are not contained in the list of entries are added to the list of entries as new entries, and where the likelihood of the new entries is set higher than an average likelihood of the entries in the list of entries, and
where the navigation information contains at least one of the following information: an overall travel time of the trip, the current travel time of the trip, and an expected arrival time.

13. A system for supporting a text input in an input unit, comprising:
a navigation unit configured to generate navigation information of a trip to a predetermined destination;
an input unit for inputting the text input;
a language model database comprising a list of entries and language model statistics for the list of entries; and
a text recognition unit configured to receive words in the navigation information from the navigation unit, and to adjust the language model statistics for entries in the list of entries that are contained in the navigation information, the text input recognition unit being configured to recognize the text input by comparing at least a first part of the text input to the list of entries in the language model database based on the modified language model statistics in order to suggest a most likely candidate of a completed text input,
where the text recognition unit detects whether words in the navigation information are contained in the list of entries,
where any words in the navigation information that are not contained in the list of entries are added to the list of entries as new entries, and where the likelihood of the new entries is set higher than an average likelihood of the entries in the list of entries, and
where the navigation information contains at least one of the following information: an overall travel time of the trip, the current travel time of the trip, and an expected arrival time.

* * * * *